United States Patent
Inoue et al.

(10) Patent No.: US 12,145,358 B2
(45) Date of Patent: Nov. 19, 2024

(54) INK JET PRINTING METHOD

(71) Applicant: CANON KABUSHIKI KAISHA, Tokyo (JP)

(72) Inventors: Koji Inoue, Tokyo (JP); Keiichirou Takeuchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 154 days.

(21) Appl. No.: 17/839,706

(22) Filed: Jun. 14, 2022

(65) Prior Publication Data

US 2022/0396069 A1 Dec. 15, 2022

(30) Foreign Application Priority Data

Jun. 15, 2021 (JP) .................................. 2021-099784
Jun. 9, 2022 (JP) .................................. 2022-093789

(51) Int. Cl.
*B41J 2/035* (2006.01)
*C09D 11/037* (2014.01)
*C09D 11/322* (2014.01)

(52) U.S. Cl.
CPC .............. *B41J 2/035* (2013.01); *C09D 11/037* (2013.01); *C09D 11/322* (2013.01)

(58) Field of Classification Search
CPC ..... B41J 2/035; B41J 11/0015; C09D 11/037; C09D 11/322; B41M 5/0011
USPC .......................................................... 347/44
See application file for complete search history.

(56) References Cited

U.S. PATENT DOCUMENTS

| | | | |
|---|---|---|---|
| 9,566,781 B2 | 2/2017 | Takeuchi et al. | |
| 9,789,705 B2 | 10/2017 | Takeuchi et al. | |
| 2003/0118790 A1* | 6/2003 | Ilda | C08J 5/18 |
| | | | 428/195.1 |
| 2014/0204156 A1* | 7/2014 | Gotou | C09D 11/40 |
| | | | 347/100 |
| 2015/0258813 A1* | 9/2015 | Saitoh | B41J 11/009 |
| | | | 347/19 |

FOREIGN PATENT DOCUMENTS

JP 2018-138384 A 9/2018
JP 2019-130869 A 8/2019

* cited by examiner

*Primary Examiner* — Jason S Uhlenhake
*Assistant Examiner* — Alexander D Shenderov
(74) *Attorney, Agent, or Firm* — Venable LLP (57) ABSTRACT

Provided is an ink jet printing method including: subjecting a printing medium to corona discharge treatment; and applying an ink containing an anionic pigment to a surface of the printing medium subjected to the corona discharge treatment, wherein the corona discharge treatment has a discharge quantity of 3,400 W·min/m² or more.

8 Claims, 7 Drawing Sheets

FIG. 7

INK JET PRINTING METHOD

BACKGROUND OF THE DISCLOSURE

Field of the Disclosure

The present disclosure relates to an ink jet printing method.

Description of the Related Art

In an ink jet printing system, an image is formed by directly or indirectly applying a liquid composition (ink) containing a coloring material onto a printing medium such as paper. At this time, when a time interval between the application of a dot of the ink applied from an ink jet printing head and the application of a dot adjacent thereto is short, the subsequent adjacent dot is applied before the ink droplet that has previously landed on the printing medium permeates the printing medium, and is dried and fixed thereon, and hence a problem, such as beading or bleeding, may occur. In addition, in the case where a primary color to be previously applied in multicolor image formation is a solid image, when the ink that has been previously applied does not permeate the printing medium, and is not dried or fixed thereon, the ink droplet to be subsequently applied is embedded in the ink droplet that has been previously applied onto the printing medium, and hence the color developability of the image to be obtained may reduce. Those problems become more remarkable when the permeability of the ink into the printing medium is low or the medium is impermeable to the ink.

As related art for solving problems, such as beading and bleeding, there have been proposed a method of suppressing the movement of a pigment that is a coloring material and a method of suppressing the beading, each of which includes treating the surface of a printing medium with a plasma treatment unit to change the wettability, pH value, and permeability of the printing medium, to thereby improve an ink dot roundness (Japanese Patent Application Laid-Open No. 2018-138384).

In addition to the foregoing, as a method of obtaining a vivid image through the surface treatment of a printing medium, there has been proposed a method including treating the surface of the printing medium with a corona treatment unit to improve the wettability of the printing medium (Japanese Patent Application Laid-Open No. 2019-130869).

SUMMARY OF THE DISCLOSURE

The present disclosure is directed to provide an ink jet printing method by which a phenomenon in which a subsequently applied ink droplet is embedded in a previously applied ink droplet is suppressed, and hence an image that is vivid and has high color developability can be printed.

According to one aspect of the present disclosure, there is provided an ink jet printing method including: subjecting a printing medium to corona discharge treatment; and applying an ink containing an anionic pigment to a surface of the printing medium subjected to the corona discharge treatment, wherein the corona discharge treatment has a discharge quantity of 3,400 W·min/m$^2$ or more.

Further features of the present disclosure will become apparent from the following description of exemplary embodiments with reference to the attached drawings.

DESCRIPTION OF THE EMBODIMENTS

Although the problems of beading and bleeding are alleviated by the methods of Japanese Patent Application Laid-Open No. 2018-138384 and Japanese Patent Application Laid-Open No. 2019-130869, none of the methods has sufficed for the suppression of a phenomenon in which a subsequently applied ink droplet is embedded in a previously applied ink droplet to reduce the color developability of an image.

In view of the foregoing, the inventors of the present disclosure have made extensive investigations on an ink jet printing method by which the phenomenon in which a subsequently applied ink droplet is embedded in a previously applied ink droplet is suppressed, and hence an image that is vivid and has high color developability can be printed. Thus, the inventors have reached the present disclosure.

An ink jet printing method according to this embodiment includes: subjecting a printing medium to corona discharge treatment; and applying an ink containing an anionic pigment to a surface of the printing medium subjected to the corona discharge treatment, wherein the corona discharge treatment has a discharge quantity of 3,400 W·min/m$^2$ or more.

Typically, the hydrophilicity of the surface of the printing medium is improved by the corona discharge treatment to reduce a contact angle between water and the printing medium, and hence the water wets and spreads. Meanwhile, the inventors of the present disclosure have found that when the anionic pigment ink containing the anionic pigment is used, the anionic pigment in the ink can be aggregated and fixed by a proton produced on the surface of the printing medium by the corona discharge treatment. The inventors of the present disclosure have found that the effect is particularly significant when the discharge quantity of the corona discharge treatment is 3,400 W·min/m$^2$ or more, and the effect is more easily obtained by the corona discharge treatment than by plasma treatment. In addition, the discharge quantity of the corona discharge treatment is preferably 4,200 W·min/m$^2$ or more to 25,000 W·min/m$^2$ or less, more preferably 4,520 W·min/m² or more to 25,000 W·min/m² or less, especially preferably 5,700 W·min/m² or more to 25,000 W·min/m² or less.

The inventors of the present disclosure have assumed that it is because an oxonium ion $H_3O^+$ generated on the surface of the printing medium breaks the dispersion state of the anionic pigment that the anionic pigment is aggregated by subjecting the printing medium to the corona discharge treatment. Although the mechanism of the reason why such an ink-aggregating action as that in the case where the corona discharge treatment ((c) of FIG. 6) is performed is not observed despite the fact that the plasma treatment ((d) of FIG. 6) has a larger discharge quantity than the corona discharge treatment does is unclear, the number of $H_3O^+$ ions to be finally generated may be smaller in the plasma treatment.

The present disclosure is described below in detail by way of exemplary embodiments. However, the present disclosure is not limited to the following embodiments.

An ink jet printing apparatus to be used in the ink jet printing method according to the embodiment of the present disclosure is described below with reference to the drawings.

Figure 1:
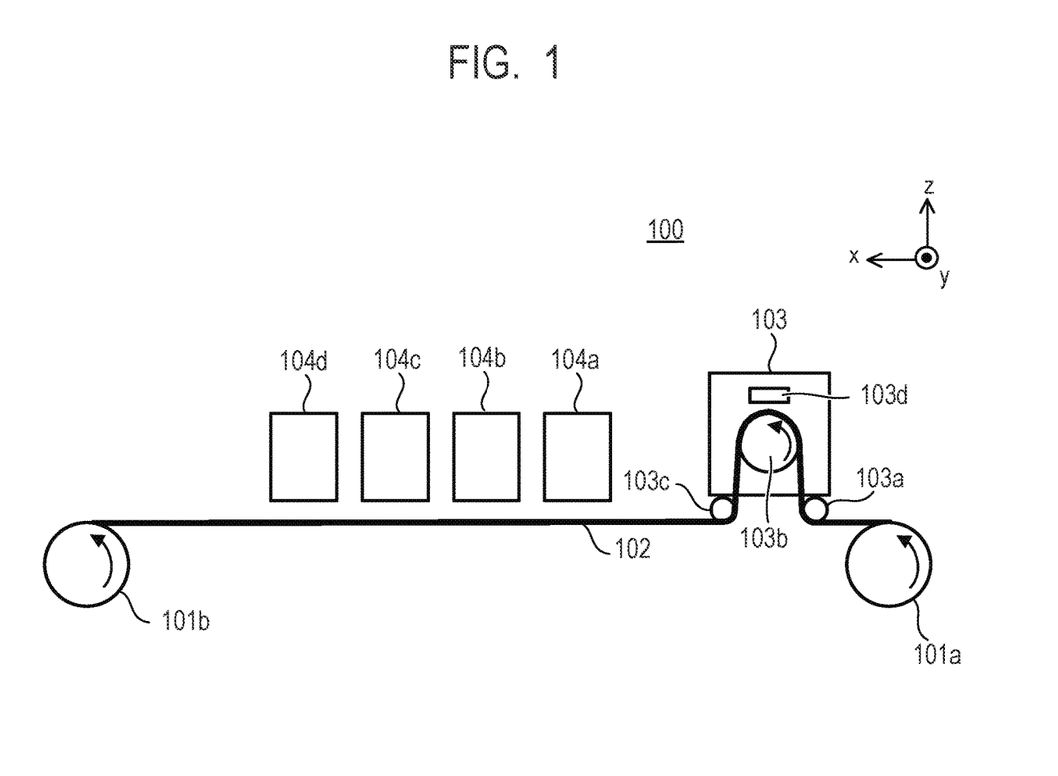
FIG. 1 is a schematic view for illustrating an example of the configuration of an ink jet printing apparatus to be used in an ink jet printing method in an embodiment of the present disclosure.

FIG. 1 is a schematic view for illustrating an example of the schematic configuration of an ink jet printing apparatus 100 to be used in the ink jet printing method of this embodiment. In this apparatus, a printing medium 102 that is continuous paper formed in a roll shape is unwound from an unwinding unit 101a, and is taken up by a take-up unit 101b. The printing medium 102 unwound from the unwinding unit 101a passes through the position of a corona discharge treatment unit 103 facing a corona electrode portion 103d to be subjected to corona discharge treatment. The distance (shortest distance) between the corona electrode portion 103d of the corona discharge unit 103 and the printing medium 102 is preferably 0.01 mm or more to 1 mm or less. After that, the medium passes through ink jet printing heads 104a to 104d, and hence respective color inks are applied thereto. The ink jet printing head 104a is a printing head for ejecting a cyan ink, the ink jet printing head 104b is a printing head for ejecting a magenta ink, the ink jet printing head 104c is a printing head for ejecting a yellow ink, and the ink jet printing head 104d is a printing head for ejecting a black ink.

<Printing Medium>

The printing medium to be used in the present disclosure, which may be sheet-shaped paper or rolled paper, is preferably a roll-shaped printing medium from the viewpoint of productivity.

An absorbable printing medium that can absorb a liquid component or the like in each of the inks and a nonabsorbable printing medium that does not absorb the liquid component are each used as the printing medium.

An example of the non-absorbable printing medium is a resin film. Examples thereof include a polyester film, a vinyl chloride film, a polypropylene film, a polyethylene film, and a nylon film.

As a commercially available product of the resin film, there are given, for example, Lumirror T60 (manufactured by Toray Industries, Inc., polyethylene terephthalate), Taiko FE2001 (manufactured by Futamura Chemical Co., Ltd., corona-treated polyethylene terephthalate), PVC80B P (manufactured by LINTEC Corporation, vinyl chloride), KINATH KEE 70CA (manufactured by LINTEC Corporation, polyethylene), Yupo SG90 PAT1 (manufactured by LINTEC Corporation, polypropylene), Bonyl RX (manufactured by Kohjin Film & Chemicals Co., Ltd., nylon), and PET(50) PAT1 8LK (manufactured by LINTEC Corporation, PET).

Examples of the absorbable printing medium include art paper and high-quality paper.

As a commercially available product of the absorbable printing medium, there are given, for example, 55PW8K (manufactured by LINTEC Corporation, high-quality paper) and ART E PW 8K (manufactured by LINTEC Corporation, coated paper).

<Configuration for Conveying Printing Medium>

The Y-direction length of the printing medium is 330 mm, and the conveyance velocity thereof is controlled by the rotational speeds of the unwinding unit 101a and the take-up unit 101b. The unwinding unit 101a and the take-up unit 101b are connected to a drive motor and a controlling unit (not shown) that are configured to control their rotational speeds. The conveyance velocity of the printing medium is preferably 1.5 m/min or more to 4 m/min or less.

<Corona Discharge Treatment Unit>

The Y-direction length of the corona electrode portion 103d of the corona discharge treatment unit 103 is 350 mm, and the unit is connected to a generator (not shown) from which electric power to be used in the corona discharge treatment is supplied thereto. The printing medium 102 is suspended over the idler rollers 103a and 103c of the corona discharge treatment unit, and the electrode-facing roller 103b thereof that is grounded. When the printing medium 102 passes through a space between the corona electrode portion 103d and the electrode-facing roller 103b, corona discharge is caused to subject the surface of the printing medium 102 to the corona discharge treatment. The discharge quantity Q [W·min/m²] of the corona discharge treatment can be controlled from the electric power E [W] of the generator, an electrode width D [m], and the conveyance velocity V [m/min] of the printing medium 102 by the relationship of the equation (1).

$$Q = E/(D \times V) \quad \text{Equation (1)}$$

Figure 2:
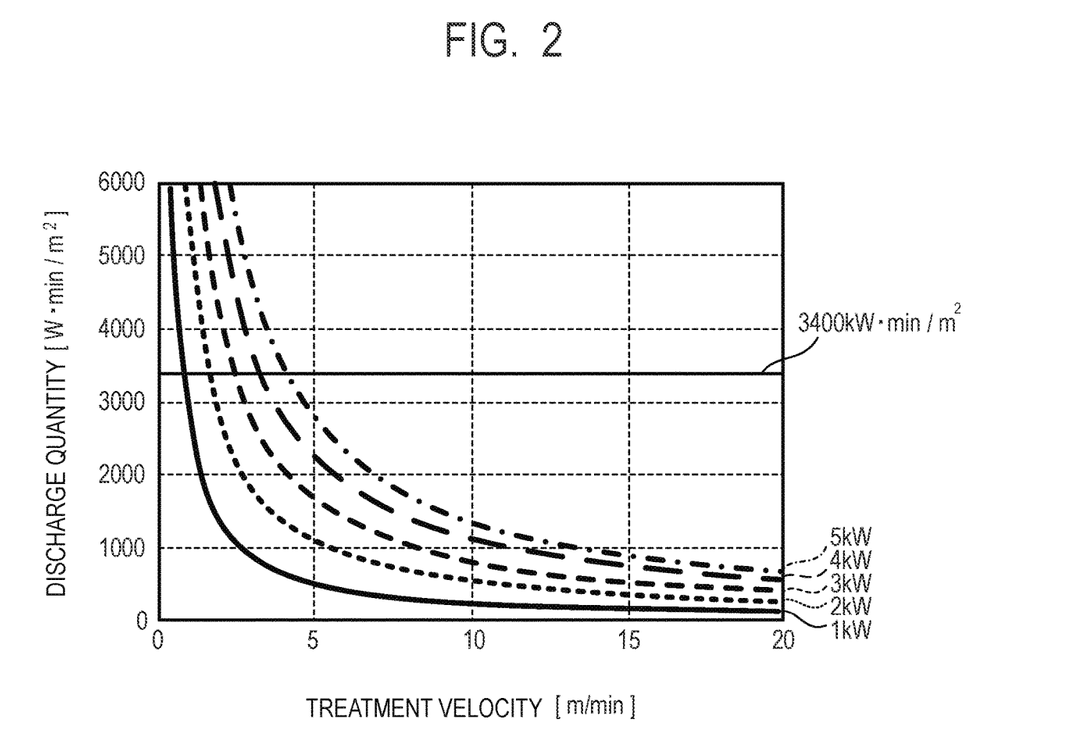
FIG. 2 is a graph for showing a relationship among the electric power, treatment velocity, and discharge quantity of corona discharge treatment.

FIG. 2 shows the relationship of the discharge quantity of the corona discharge treatment with respect to a generator output and the conveyance velocity of the printing medium. An increase in generator output or a reduction in treatment velocity is effective in achieving a discharge quantity equal to or more than a target value.

Figure 3:
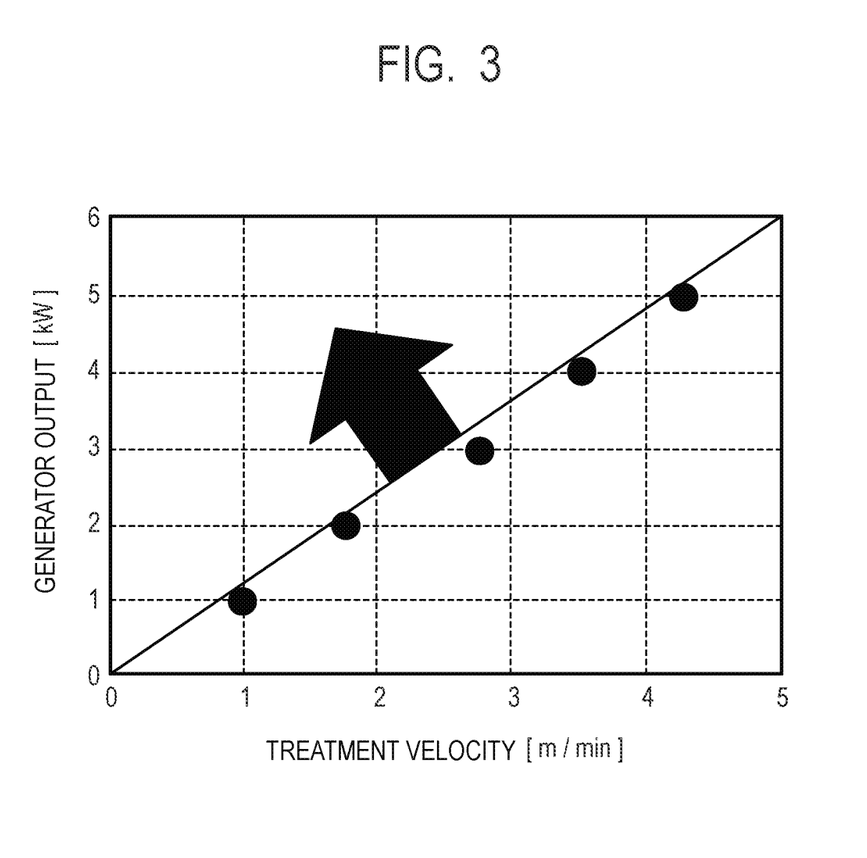
FIG. 3 is a graph for showing a relationship between the treatment velocity and a generator output that provide a discharge quantity of 3,400 W·min/m$^2$ or more.

FIG. 3 shows a relationship between the generator output and the treatment velocity required for the achievement of a discharge quantity of 3,400 W·min/m² in FIG. 2. When the corona discharge treatment is performed under conditions in a region indicated by the arrow in FIG. 3, corona discharge treatment having a discharge quantity of 3,400 W·min/m² or more can be performed.

As described above, the discharge quantity of the corona discharge treatment may be adjusted by changing an output of the corona discharge treatment and a conveyance velocity of the printing medium. The output of the corona discharge treatment (the electric power supplied by the generator) is preferably 3000 W or more to 5000 W or less.

<Ink Applying Device>

In this embodiment, an ink jet printing head is used as an ink applying device for applying an ink. Examples of the ink jet printing head include: an ink jet printing head configured to eject an ink by causing film boiling in the ink through use of an electrothermal converter to form air bubbles; an ink jet printing head configured to eject an ink through use of an electromechanical converter; and an ink jet printing head configured to eject an ink through utilization of static electricity. In this embodiment, a known ink jet printing head may be used. Of those, particularly from the viewpoint of performing high-speed and high-density printing, an ink jet printing head utilizing an electrothermal converter is suitably used. Image printing onto the printing medium is performed when the head receives an image signal to apply a required ink amount to each position.

In this embodiment, the ink jet printing head is a full-line printing head extended in a Y direction, and its nozzles are arrayed in a range covering the width of the image printing region of a printing medium having the maximum usable size. The ink jet printing head has, on its lower surface (printing medium 102 side), an ink ejection surface having opened therein the nozzles, and the ink ejection surface faces the surface of the printing medium 102 with a minute gap (about several millimeters) therebetween.

Although the amount of the ink to be applied to the printing medium may be represented by, for example, the density value of image data and the thickness of the ink, an average obtained by dividing the product of the mass of each ink dot (ink droplet) and the number of applied dots by a printed area was adopted as an ink application amount ($g/m^2$) in this embodiment. The maximum ink application amount in an image region refers to the amount of the ink applied to an area of at least 5 $mm^2$ in a region to be used as information on the printing medium from the viewpoint of removing the liquid component in the ink.

The ink applying device may include the plurality of ink jet printing heads (104a to 104d) for applying the respective color inks onto the printing medium. For example, when respective color images are formed with the yellow ink, the magenta ink, the cyan ink, and the black ink, the ink applying device includes four ink jet printing heads for ejecting the four kinds of inks onto the printing medium, and the heads are arranged so as to be aligned in an X direction.

<Ink>

Respective components, such as a coloring material, a resin, an aqueous medium, and an additive, for forming each of the inks to be applied to this embodiment are described in detail below.

(Coloring Material)

An anionic pigment is used as the coloring material. The content of the coloring material in the ink is preferably 0.5 mass % or more to 15.0 mass % or less, more preferably 1.0 mass % or more to 10.0 mass % or less with respect to the total mass of the ink.

Specific examples of the anionic pigment may include: inorganic pigments, such as carbon black and titanium oxide; and organic pigments, such as azo, phthalocyanine, quinacridone, isoindolinone, imidazolone, diketopyrrolopyrrole and dioxazine pigments.

With regard to the mode of dispersion of the pigment, for example, a resin-dispersed pigment using a resin as a dispersant or a self-dispersing pigment in which a hydrophilic group is bonded to the particle surface of a pigment may be used. In addition, for example, a resin-bonded pigment obtained by chemically bonding an organic group containing a resin to the particle surface of a pigment or a microcapsule pigment obtained by covering the particle surface of a pigment with a resin or the like may be used.

As a resin dispersant for dispersing the pigment in an aqueous medium, one capable of dispersing the pigment in the aqueous medium through the action of an anionic group is preferably used. As the resin dispersant, such a resin as described later may be suitably used, and a water-soluble resin may be more suitably used. The content (mass %) of the pigment is preferably 0.3 times or more to 10.0 times or less in terms of mass ratio with respect to the content of the resin dispersant (pigment/resin dispersant).

As the self-dispersing pigment, one having an anionic group, such as a carboxylic acid group, a sulfonic acid group or a phosphonic acid group, bonded to the particle surface of a pigment directly or via another atomic group (—R—) may be used. The anionic group may be any of an acid type and a salt type. In the case of the salt type, the anionic group may be in any of a partially dissociated state and a completely dissociated state. When the anionic group is of the salt type, as a cation serving as a counter ion, there may be given, for example: an alkali metal cation; ammonium; and an organic ammonium. In addition, specific examples of the other atomic group (—R—) may include: a linear or branched alkylene group having 1 to 12 carbon atoms; an arylene group, such as a phenylene group or a naphthylene group; a carbonyl group; an imino group; an amide group; a sulfonyl group; an ester group; and an ether group. In addition, a group formed by combining those groups may also be adopted.

In addition, a dye may be used together with the pigment as required.

As the dye, one having an anionic group is preferably used. Specific examples of the dye may include azo, triphenylmethane, (aza)phthalocyanine, xanthene and anthrapyridone dyes.

(Resin)

The ink may contain a resin. The content (mass %) of the resin in the ink is preferably 0.1 mass % or more to 20.0 mass % or less, more preferably 0.5 mass % or more to 15.0 mass % or less with respect to the total mass of the ink.

The resin may be added to the ink for, for example, the following reasons: (i) to stabilize the dispersion state of the pigment, that is, to serve as the above-mentioned resin dispersant or an aid therefor; and (ii) to improve various characteristics of an image to be printed. Examples of the form of the resin may include a block copolymer, a random copolymer, a graft copolymer and a combination thereof. In addition, the resin may be in a state of being dissolved as a water-soluble resin in an aqueous medium, or may be in a state of being dispersed as resin particles in an aqueous medium. The resin particles do not need to include the coloring material. The ink preferably contains anionic resin particles.

In the present disclosure, that the resin is water-soluble is defined as follows: when the resin is neutralized with an alkali in an amount equivalent to its acid value, the resin does not form particles whose particle diameters are measurable by a dynamic light scattering method. Whether or not the resin is water-soluble may be judged in accordance with the following method. First, a liquid (resin solid content: 10 mass %) containing a resin neutralized with an alkali (e.g., sodium hydroxide or potassium hydroxide) corresponding to its acid value is prepared. Subsequently, the prepared liquid is diluted 10-fold (on a volume basis) with pure water to prepare a sample solution. Then, in the case where the particle diameter of the resin in the sample solution is measured by the dynamic light scattering method, when particles having particle diameters are not measured, the resin in question may be judged to be water-soluble. In this case, measurement conditions may be set, for example, as follows: SetZero: 30 seconds, number of times of measurement: 3, and measurement time: 180 seconds. A particle size analyzer based on the dynamic light scattering method (e.g., product name: "UPA-EX150", manufactured by Nikkiso Co., Ltd.) or the like may be used as a particle size distribution measuring apparatus. Of course, the particle size distribution measuring apparatus to be used, the measurement conditions, and the like are not limited to the foregoing.

The acid value of the resin is preferably 100 mgKOH/g or more to 250 mgKOH/g or less in the case of a water-soluble resin, and is preferably 5 mgKOH/g or more to 100 mgKOH/g or less in the case of resin particles. The weight-average molecular weight of the resin is preferably 3,000 or more to 15,000 or less in the case of a water-soluble resin, and is preferably 1,000 or more to 2,000,000 or less in the case of resin particles. The volume-average particle diameter of the resin particles as measured by the dynamic light scattering method (under measurement conditions similar to those described above) is preferably 100 nm or more to 500 nm or less.

Examples of the resin may include an acrylic resin, a urethane-based resin and an olefin-based resin. Of those, an acrylic resin and a urethane resin are preferred.

As the acrylic resin, one having a hydrophilic unit and a hydrophobic unit as structural units is preferred. Of those, a resin having a hydrophilic unit derived from (meth)acrylic acid and a hydrophobic unit derived from at least one of a monomer having an aromatic ring or a (meth)acrylic acid ester-based monomer is preferred. In particular, a resin having a hydrophilic unit derived from (meth)acrylic acid and a hydrophobic unit derived from at least one monomer of styrene or α-methylstyrene is preferred. Each of those resins may be suitably utilized as a resin dispersant for dispersing a pigment because interaction between the resin and the pigment easily occurs.

In the present disclosure, (meth)acrylic acid means acrylic acid or methacrylic acid.

The hydrophilic unit is a unit having a hydrophilic group such as an anionic group. The hydrophilic unit may be formed by, for example, polymerizing a hydrophilic monomer having a hydrophilic group. Specific examples of the hydrophilic monomer having a hydrophilic group may include: acidic monomers each having a carboxylic acid group, such as (meth)acrylic acid, itaconic acid, maleic acid, and fumaric acid; and anionic monomers, such as anhydrates and salts of those acidic monomers. Examples of a cation forming the salt of the acidic monomer may include lithium, sodium, potassium, ammonium, and organic ammonium ions. The hydrophobic unit is a unit free of a hydrophilic group such as an anionic group. The hydrophobic unit may be formed by, for example, polymerizing a hydrophobic monomer free of a hydrophilic group such as an anionic group. Specific examples of the hydrophobic monomer may include: monomers each having an aromatic ring, such as styrene, α-methylstyrene, and benzyl (meth)acrylate; and (meth)acrylic acid ester-based monomers, such as methyl (meth)acrylate, butyl (meth)acrylate, and 2-ethylhexyl (meth)acrylate.

The urethane-based resin may be obtained by, for example, subjecting a polyisocyanate and a polyol to a reaction with each other. In addition, the urethane-based resin may be obtained by further subjecting a chain extender to a reaction with the polyisocyanate and the polyol. Examples of the olefin-based resin include polyethylene and polypropylene.

(Aqueous Medium)

The ink may contain water or an aqueous medium that is a mixed solvent of water and a water-soluble organic solvent. As the water, deionized water or ion-exchanged water is preferably used. The content (mass %) of the water in the aqueous ink is preferably 50.0 mass % or more to 95.0 mass % or less with respect to the total mass of the ink. In addition, the content (mass %) of the water-soluble organic solvent in the aqueous ink is preferably 3.0 mass % or more to 50.0 mass % or less with respect to the total mass of the ink. As the water-soluble organic solvent, any of those usable for ink for ink jet, such as alcohols, (poly)alkylene glycols, glycol ethers, nitrogen-containing compounds, and sulfur-containing compounds, may be used.

(Other Additives)

The ink may contain, in addition to the above-mentioned components, various additives, such as an antifoaming agent, a surfactant, a pH adjuster, a viscosity modifier, a corrosion inhibitor, a preservative, an antifungal agent, an antioxidant, and a reduction inhibitor, as required.

<Control System>

Figure 4:
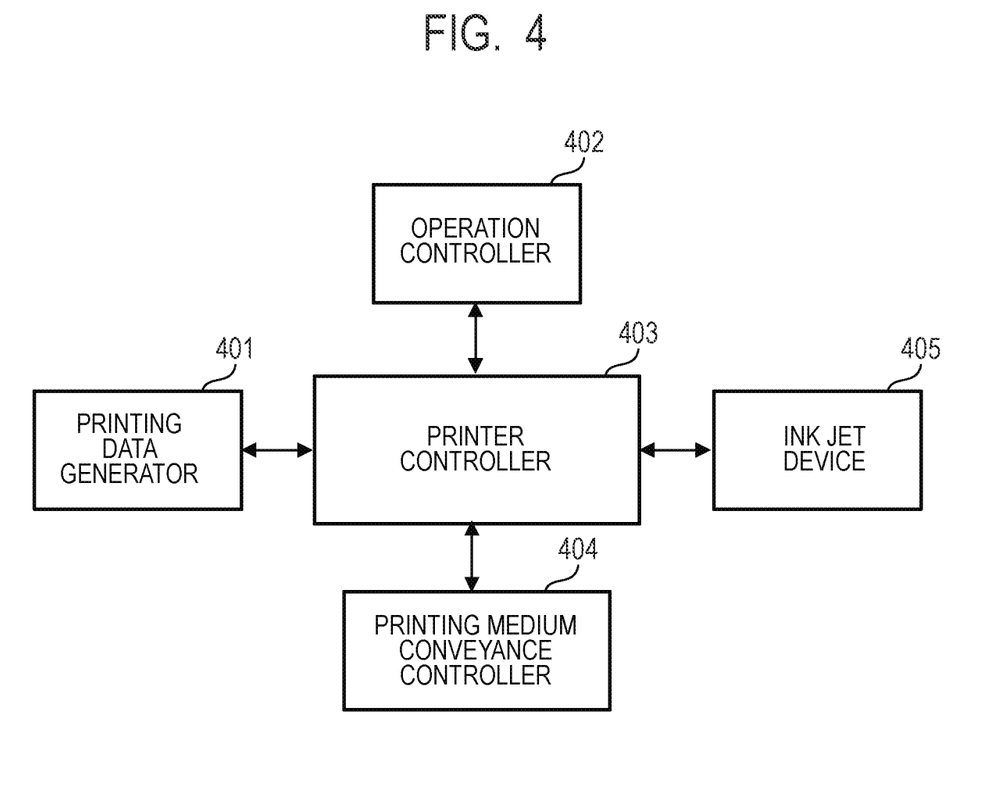
FIG. 4 is a block diagram for illustrating a control system for the entirety of the ink jet printing apparatus illustrated in FIG. 1.

The ink jet printing apparatus to be used in the ink jet printing method in this embodiment includes a control system for controlling its respective devices. FIG. 4 is a block diagram for illustrating a control system for the entirety of the ink jet printing apparatus illustrated in FIG. 1.

In FIG. 4, there are illustrated: a printing data generator 401 such as an external print server; an operation controller 402 such as an operation panel; a printer controller 403 for conducting a printing process; a printing medium conveyance controller 404 for conveying the printing medium; and an ink jet device 405 for performing printing.

Figure 5:
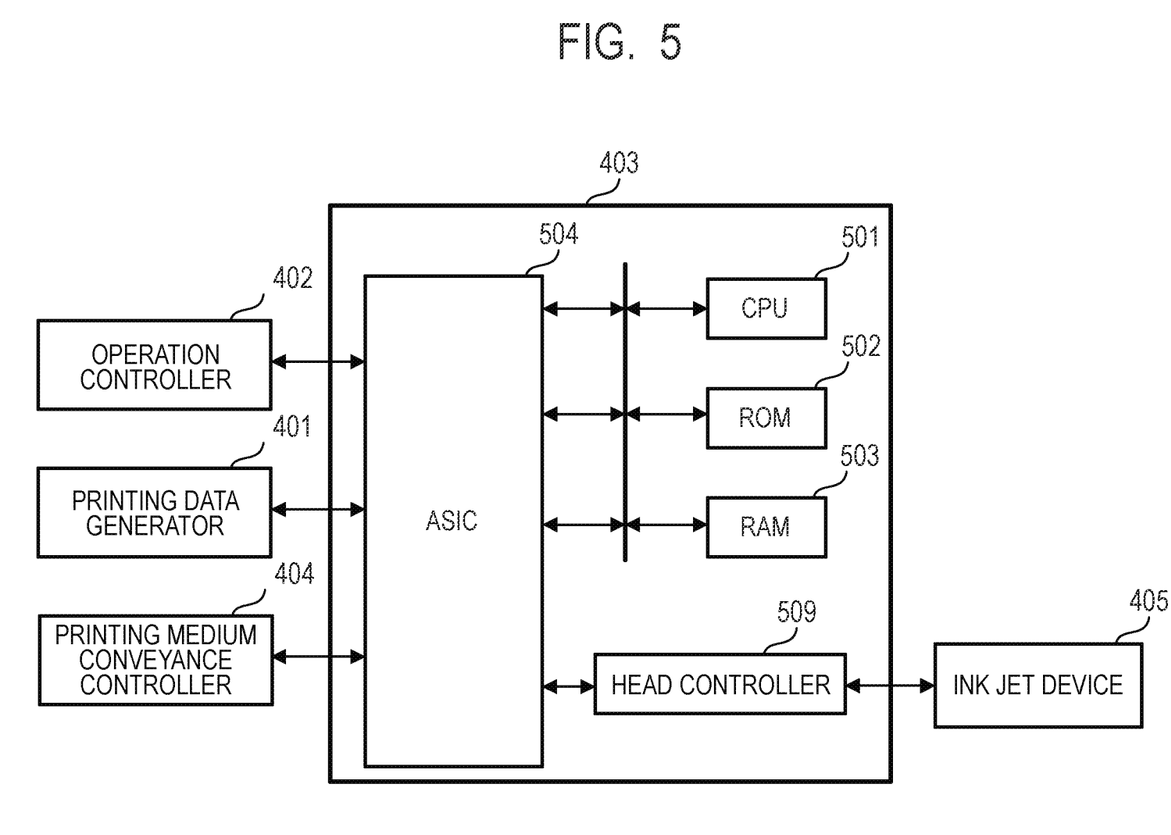
FIG. 5 is a block diagram of a printer controller in the ink jet printing apparatus illustrated in FIG. 1.

FIG. 5 is a block diagram of the printer controller of FIG. 4 in the ink jet printing apparatus of FIG. 1.

A CPU 501 is configured to control the entirety of a printer, a ROM 502 is configured to store the control program of the CPU 501, and a RAM 503 is configured to execute a program. An application specific integrated circuit (ASIC) 504 includes a network controller, a serial IF controller, a controller for printing head data generation, a motor controller, and the like. A printing head controller 509 is configured to, for example, generate final ejection data for the ink jet device 405 and generate a driving voltage.

According to the present disclosure, the ink jet printing method by which a phenomenon in which a subsequently applied ink droplet is embedded in a previously applied ink droplet is suppressed, and hence an image that is vivid and has high color developability can be printed can be provided.

EXAMPLES

This embodiment is described in more detail below by way of Examples and Comparative Examples. The present disclosure is by no means limited to the following Examples, and various modifications may be made without departing from the gist of the present disclosure.

Figure 6:
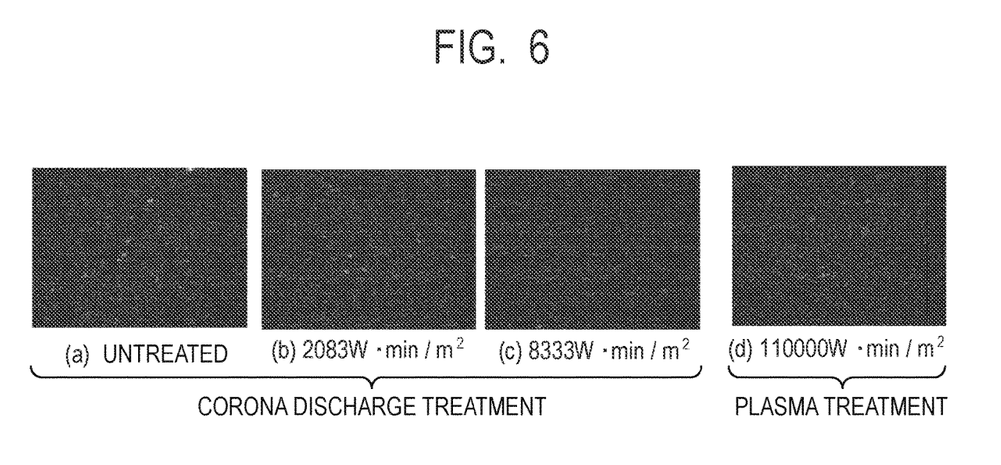
FIG. 6 is a graph for illustrating photographs of respective images at the time of image formation by the application of inks onto printing media subjected to the corona discharge treatment and plasma treatment.

In FIG. 6, (a) to (d) are each a photograph of an image when the image is formed on a printing medium subjected to corona discharge treatment or plasma treatment. A PET medium was used as the printing medium. Inks are each an aqueous pigment ink containing an anionic pigment and water, and after a cyan ink had been solid-printed at 9 ng/m$^2$, each dot of a yellow ink was printed every 5 spaces.

CORONA MASTER PS-1M (manufactured by Shinko Electric & Instrumentation Co., Ltd., corona discharge electric power: 300 W, treatment width: 200 mm) was used in the corona discharge treatment. Treatment having a discharge quantity of 8,333 W·min/m$^2$ was performed at a treatment velocity of 1.8 m/min and a number of treatment scans of six, and treatment having a discharge quantity of 2,083 W·min/m$^2$ was performed at a treatment velocity of 7.2 m/min and a number of treatment scans of six.

AP-T02-L150 (manufactured by Sekisui Chemical Co., Ltd., plasma generation electric power: 355.5 W, treatment width: 30 mm) was used in the plasma treatment. A mixed gas of oxygen and nitrogen (oxygen: 3%) was flowed through a plasma-generating portion to perform treatment having a discharge quantity of 110,000 W·min/m² at a treatment velocity of 0.11 m/min and a number of treatment scans of one.

When an untreated printing medium is used, a subsequent yellow ink droplet is embedded in the cyan ink that has previously formed a solid image. Further, yellow dots each extend in an elongated shape through advection caused by the drying of the cyan ink ((a) of FIG. 6).

Next, when the printing medium was subjected to the corona discharge treatment, at a corona discharge quantity of 8,333 W·min/m², the cyan ink was aggregated to make it difficult for the subsequent yellow ink to be embedded therein. In addition, advection in the cyan ink was suppressed, and hence the roundness of each of yellow dots was improved ((c) of FIG. 6). At a corona discharge quantity of 2,083 W·min/m² ((b) of FIG. 6), a certain ink-aggregating effect was observed, but was not as large as that in (c) of FIG. 6, and hence it was found that the degree of an aggregating action on the previous ink depended on the corona discharge quantity. Meanwhile, when the printing medium was subjected to the plasma treatment ((d) of FIG. 6), the following result was obtained despite the fact that the discharge quantity was 110,000 W·min/m²: no aggregating effect on the previous cyan ink was observed, and hence the subsequent yellow ink was embedded therein and its dots each extended in an elongated shape through the advection of the cyan ink.

Figure 7:
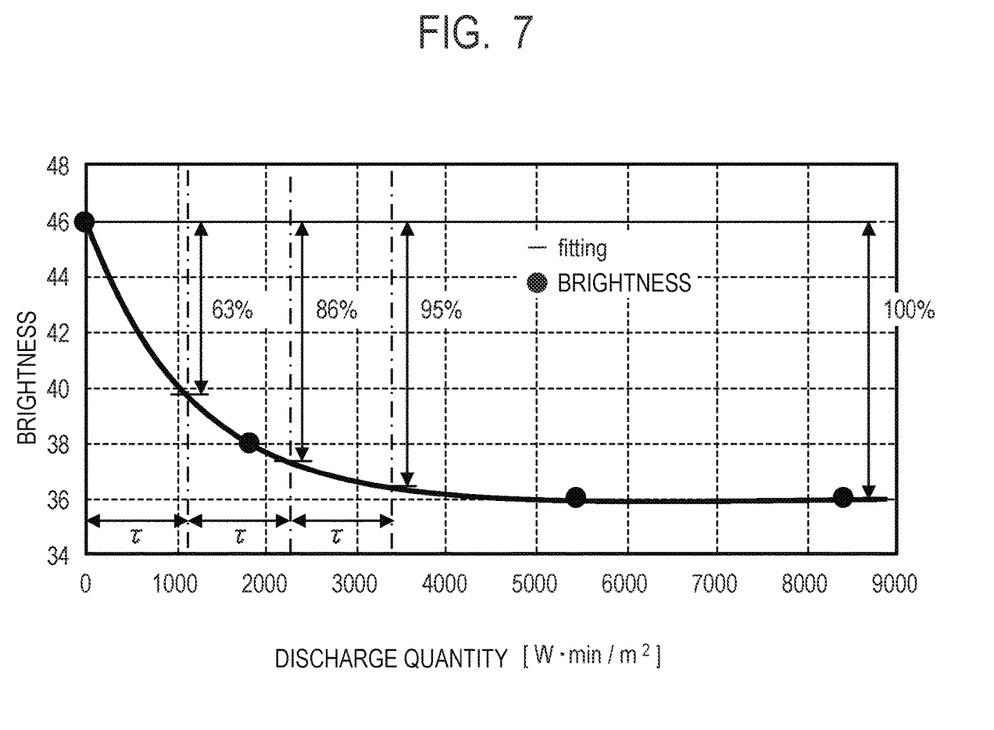
FIG. 7 is a graph for showing a relationship between the discharge quantity of the corona discharge treatment and the brightness of an image.

In addition, those tendencies described above also appear in image brightness. FIG. 7 shows a relationship between a discharge quantity and the brightness of a cyan image when the image in which 6.8 ng/m² of the cyan ink has been solid-printed is subjected to corona discharge treatment. When the discharge quantity was increased, the brightness reduced, and was saturated at a discharge quantity of 5,400 W·min/m² or more. In consideration of the foregoing together with the result of (a) of FIG. 6, at 8,333 W·min/m² in (c) of FIG. 6, the previous ink is sufficiently aggregated to solve the problem of the embedment of the subsequent ink, and the brightness sufficiently reduces to the bottom. At 2,083 W·min/m² in (b) of FIG. 6, the aggregation of the previous ink is insufficient, and the brightness does not reduce to the bottom. It is conceivable from those results that the corona discharge quantity at which the problem of the embedment of the subsequent ink can be solved and the brightness can be sufficiently reduced can be determined from the change in brightness of FIG. 7. The brightness shown in FIG. 7 exponentially changed with the discharge quantity, and was hence able to be approximated by the equation (2).

$$L = (46-36) \times \exp(-Q/\tau) + 36 \quad \text{Equation (2)}$$

L represents the brightness, Q represents the discharge quantity of the corona discharge treatment, and $\tau (=1,129$ W·min/m²) represents an attenuation coefficient. As can be seen from the relationship, when the discharge quantity is set to $\tau$, the brightness reduces from its initial value by 63%. Similarly, when the discharge quantity is set to $2\tau$, the brightness reduces by 86%. In addition, similarly, when the discharge quantity is set to $3\tau$, the brightness reduces by 95%. It was found that although the aggregating effect on the previous ink was insufficient in (b) of FIG. 6 in which the discharge quantity was substantially comparable to $2\tau$, the problem of the embedment of the subsequent ink was able to be solved and the brightness was able to be sufficiently reduced by setting the discharge quantity to preferably $3\tau=3,386$ W·min/m² or more. The discharge quantity is more preferably set to $4\tau=4,520$ W·min/m² or more because the aggregating effect on the previous ink can be more reliably obtained.

It was found from the foregoing that the following was effective in expressing an ink-aggregating action: the corona discharge treatment was used and its discharge quantity was set to 3,400 W·min/m² or more. Meanwhile, the surface of a printing medium after its corona discharge treatment was evaluated because concern was raised in that the surface of the printing medium was damaged by the corona discharge.

PET50(A) PAT1 8LK (manufactured by LINTEC Corporation, PET) and ART E PW 8E (manufactured by LINTEC Corporation, art paper) were used as printing media, and the evaluation was performed at a discharge quantity of up to 25,000 W·min/m². Although the appearances of each of the printing media before and after its treatment were compared, no change in color or transparency of the printing medium occurred, and no change in surface shape (Sa) thereof was observed. That is, it was revealed that the surface of the printing medium was not damaged by the corona discharge at a discharge quantity of up to 25,000 W·min/m².

In view of the foregoing, to express an ink-aggregating effect and to avoid damage to the printing medium by the corona discharge, the discharge quantity is preferably set to 4,520 W·min/m² or more to 25,000 W·min/m² or less.

Example 1

In Example 1 herein, the ink jet printing apparatus illustrated in FIG. 1 was used. PET50(A) PAT1 8LK (manufactured by LINTEC Corporation, PET) was used as the printing medium 102. The corona discharge treatment unit 103 is connected to the generator (not shown), and the generator can supply a maximum electric power of 5,000 W. In this example, printing was performed while an electric power supplied by the generator was set to 3,000 W, and the conveyance velocity of the printing medium 102 was set to 2.5 m/min. A corona discharge quantity at this time was 3,430 W·min/m², which was a discharge quantity sufficient to aggregate a previous ink, and hence the problem of the embedment of a subsequent ink did not occur and an image having high color developability was able to be obtained.

Example 2

The conditions of this example are basically the same as those of Example 1, and only conditions concerning the conveyance velocity of the printing medium 102 and the electric power supplied by the generator connected to the corona discharge treatment unit 103 differ from those of Example 1. In this example, a printing job 1 was performed while the electric power supplied by the generator was set to 3,000 W, and the conveyance velocity of the printing medium 102 was set to 2.5 m/min. After that, to improve printing productivity, a printing job 2 was performed while the conveyance velocity of the printing medium 102 was changed to 4 m/min. At this time, to satisfy a condition concerning the discharge quantity of corona discharge treatment, the electric power supplied by the generator was changed to 5,000 W. Thus, the discharge quantity by the corona discharge treatment became 3,570 W·min/m², and hence the printing productivity was able to be improved while a corona discharge quantity condition required for sufficient aggregation of the previous ink, that is, 3,400 W·min/m² or more was maintained.

Example 3

The conditions of Example 3 herein are the same as those of Example 1, and printing was performed while the electric power supplied by the generator was set to 3,000 W, and the conveyance velocity of the printing medium 102 was set to 1.5 m/min. A corona discharge quantity at this time was 5,710 W·min/m², which was a discharge quantity more sufficient to aggregate the previous ink than that of Example 1, and hence the problem of the embedment of the subsequent ink did not occur and an image having high color developability was able to be obtained.

Example 4

The conditions of this example are basically the same as those of Example 3, and only conditions concerning the conveyance velocity of the printing medium 102 and the electric power supplied by the generator connected to the corona discharge treatment unit 103 differ from those of Example 3. In this example, a printing job 1 was performed while the electric power supplied by the generator was set to 3,000 W, and the conveyance velocity of the printing medium 102 was set to 1.5 m/min. After that, to improve printing productivity, a printing job 2 was performed while the conveyance velocity of the printing medium 102 was changed to 2.5 m/min. At this time, to satisfy a condition concerning the discharge quantity of corona discharge treatment, the electric power supplied by the generator was changed to 5,000 W. Thus, the discharge quantity by the corona discharge treatment became 5,710 W·min/m², and hence, in the same manner as in Example 3, the printing productivity was able to be improved while a corona discharge quantity condition required for sufficient aggregation of the previous ink, that is, 5,710 W·min/m² or more was maintained.

Comparative Example 1

Although the conditions of this comparative example are the same as those of Example 1, no corona discharge treatment was performed, and printing was performed while the conveyance velocity of the printing medium 102 was set to 1.5 m/min. When no corona discharge treatment was present, no aggregating action on the previous ink was exhibited, and hence an image having low color developability was obtained.

Comparative Example 2

In this comparative example, printing was performed in the same manner as in Example 1 except that a condition of Example 1 was changed as follows: the corona discharge treatment unit 103 was changed to a plasma treatment unit. Plasma treatment was performed at a discharge quantity of 110,000 W·min/m². In the treatment, however, an aggregating action on the previous ink was insufficient, and hence an image having low color developability was obtained.

The disclosure of this embodiment includes the following methods.

(Method 1) An ink jet printing method comprising:
  subjecting a printing medium to corona discharge treatment; and
  applying an ink containing an anionic pigment to a surface of the printing medium subjected to the corona discharge treatment,
  wherein the corona discharge treatment has a discharge quantity of 3,400 W·min/m² or more.

(Method 2) The ink jet printing method according to method 1, wherein the discharge quantity is 4,200 W·min/m² or more to 25,000 W·min/m² or less.

(Method 3) The ink jet printing method according to method 1 or 2, wherein the discharge quantity is 5,700 W·min/m² or more to 25,000 W·min/m² or less.

(Method 4) The ink jet printing method according to any one of methods 1 to 3, wherein the discharge quantity of the corona discharge treatment is adjusted by changing an output of the corona discharge treatment and a conveyance velocity of the printing medium.

(Method 5) The ink jet printing method according to any one of method 1 to 4, wherein a conveyance velocity of the printing medium is 1.5 m/min or more to 4 m/min or less.

(Method 6) The ink jet printing method according to any one of methods 1 to 5, wherein an output of the corona discharge treatment is 3000 W or more to 5000 W or less.

(Method 7) The ink jet printing method according to any one of method 1 to 6, wherein the ink contains anionic resin particles.

(Method 8) The ink jet printing method according to any one of methods 1 to 7, wherein the ink contains water, and a content of the water in the ink is 50.0 mass % or more to 95.0 mass % or less.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-099784 filed Jun. 15, 2021, and Japanese Patent Application No. 2022-093789 filed Jun. 9, 2022, which are hereby incorporated by reference herein in their entirety.

What is claimed is:

1. An ink jet printing method comprising:
  subjecting a printing medium to corona discharge treatment; and
  applying an ink containing an anionic pigment to a surface of the printing medium subjected to the corona discharge treatment,
  wherein the corona discharge treatment has a discharge quantity of 3,400 W·min/m² or more.

2. The ink jet printing method according to claim 1, wherein the discharge quantity is 4,200 W·min/m² or more to 25,000 W·min/m² or less.

3. The ink jet printing method according to claim 1, wherein the discharge quantity is 5,700 W·min/m² or more to 25,000 W·min/m² or less.

4. The ink jet printing method according to claim 1, wherein the discharge quantity of the corona discharge treatment is adjusted by changing an output of the corona discharge treatment and a conveyance velocity of the printing medium.

5. The ink jet printing method according to claim 1, wherein a conveyance velocity of the printing medium is 1.5 m/min or more to 4 m/min or less.

6. The ink jet printing method according to claim 1, wherein an output of the corona discharge treatment is 3000 W or more to 5000 W or less.

7. The ink jet printing method according to claim 1, wherein the ink contains anionic resin particles.

8. The ink jet printing method according to claim 1, wherein the ink contains water, and a content of the water in the ink is 50.0 mass % or more to 95.0 mass % or less.

* * * * *